United States Patent
Singh

(10) Patent No.: US 10,444,079 B2
(45) Date of Patent: Oct. 15, 2019

(54) SYSTEM AND METHOD FOR ACCRETION DETECTION

(71) Applicant: Tata Consultancy Services Limited, Mumbai (IN)

(72) Inventor: Bashisht Narayan Singh, Bhubaneswar (IN)

(73) Assignee: Tata Consultancy Services Limited, Mumbai (IN)

( * ) Notice: Subject to any disclaimer, the term of this patent is extended or adjusted under 35 U.S.C. 154(b) by 217 days.

(21) Appl. No.: 15/631,455

(22) Filed: Jun. 23, 2017

(65) Prior Publication Data

US 2018/0106683 A1    Apr. 19, 2018

(30) Foreign Application Priority Data

Oct. 13, 2016  (IN) .............................. 201621035007

(51) Int. Cl.
    *G01K 1/02* (2006.01)
    *G01B 21/08* (2006.01)
    (Continued)

(52) U.S. Cl.
    CPC ............ *G01K 1/024* (2013.01); *G01B 21/085* (2013.01); *G01K 1/026* (2013.01); *G01K 7/34* (2013.01);
    (Continued)

(58) Field of Classification Search
    CPC .......... G01K 1/024; G01K 1/026; G01K 7/34; G01K 13/02; G01K 2013/026;
    (Continued)

(56) References Cited

U.S. PATENT DOCUMENTS

| | | | | |
|---|---|---|---|---|
| 3,018,663 A | * | 1/1962 | Dunlop | .................... G01B 7/06 |
| | | | | 136/204 |
| 3,512,413 A | * | 5/1970 | Blaus | ....................... G01K 1/14 |
| | | | | 136/227 |

(Continued)

OTHER PUBLICATIONS

Iqbal, W. et al. "Black-box approach to capacity identification for multi-tier applications hosted on virtualized platforms," *International Conference on Cloud and Service Computing*, Dec. 12-14, 2011, Hong Kong, China; 8 pages.

*Primary Examiner* — Lisa M Caputo
*Assistant Examiner* — Philip L Cotey
(74) *Attorney, Agent, or Firm* — Finnegan, Henderson, Farabow, Garrett & Dunner LLP

(57) ABSTRACT

This disclosure relates generally to accretion detection, and more particularly to system and a method for accretion detection within an iron kiln. The iron kiln includes a cylindrical body for holding and processing molten iron ore. In one embodiment, method includes receiving, in real-time, a first plurality of temperature values from a plurality of sensors configured on distinct locations on the outer surface of the iron kiln and is associated with a distinct sensor ID. The plurality of temperature values are compared with a reference temperature value to identify deviation in temperature gradient associated with the outer surface. Subsequently on identifying the deviation corresponding to one or more sensors, a second plurality of temperature values of surrounding locations of the one or more sensors is recorded and the presence of the accretion in the iron kiln is determined based on the second plurality of temperature values.

11 Claims, 7 Drawing Sheets

(51) Int. Cl.
- *G01K 7/34* (2006.01)
- *G01K 13/02* (2006.01)
- *F27B 7/42* (2006.01)
- *G09F 9/30* (2006.01)
- *G02F 1/163* (2006.01)
- *G09G 3/3225* (2016.01)

(52) U.S. Cl.
CPC ............ *G01K 13/02* (2013.01); *F27B 7/42* (2013.01); *G01K 2013/026* (2013.01); *G01K 2213/00* (2013.01); *G02F 2001/1635* (2013.01); *G09F 9/301* (2013.01); *G09G 3/3225* (2013.01)

(58) Field of Classification Search
CPC ..... G01K 2213/00; G01B 21/085; F27B 7/42; G02F 2001/1635; G09F 9/301; G09G 3/3225
See application file for complete search history.

(56) References Cited

U.S. PATENT DOCUMENTS

| | | | | |
|---|---|---|---|---|
| 3,913,378 | A * | 10/1975 | Hausler | G01B 7/06 374/7 |
| 4,304,597 | A * | 12/1981 | Keran | C21B 13/08 266/173 |
| 4,510,807 | A * | 4/1985 | Tokutake | F27B 7/42 177/50 |
| 5,314,247 | A * | 5/1994 | Liebert | G01K 17/20 374/166 |
| 5,772,329 | A * | 6/1998 | Bardon | G01K 17/20 374/166 |
| 5,890,805 | A * | 4/1999 | Groth | C21B 7/06 374/166 |
| 6,302,941 | B1 * | 10/2001 | Oya | C21B 5/006 266/80 |
| 6,790,034 | B1 * | 9/2004 | Kearns | F27B 7/2016 432/105 |
| 8,192,080 | B2 * | 6/2012 | Clothier | B01J 3/04 340/584 |
| 8,340,825 | B2 * | 12/2012 | Ledung | C04B 2/10 700/274 |
| 8,429,103 | B1 | 4/2013 | Aradhye et al. | |
| 2003/0028345 | A1 * | 2/2003 | Watkins | G01K 7/026 702/130 |
| 2006/0199125 | A1 * | 9/2006 | Evans | F23G 5/20 431/174 |
| 2008/0083525 | A1 * | 4/2008 | Schlichting | B22D 11/0665 164/463 |
| 2009/0138223 | A1 * | 5/2009 | Kim | B22D 11/16 702/81 |
| 2011/0144790 | A1 * | 6/2011 | Gerritsen | G01K 1/026 700/108 |
| 2011/0287375 | A1 * | 11/2011 | Peterman | F27B 7/42 432/36 |
| 2012/0143377 | A1 * | 6/2012 | Ledung | C04B 2/10 700/274 |
| 2014/0147799 | A1 * | 5/2014 | Peterman | F27B 7/32 432/36 |
| 2014/0195466 | A1 | 7/2014 | Phillipps et al. | |
| 2015/0013498 | A1 * | 1/2015 | Uekawa | C22B 1/216 75/479 |
| 2015/0029496 | A1 * | 1/2015 | Duggirala | G01N 21/43 356/128 |
| 2015/0170053 | A1 | 6/2015 | Mian | |

* cited by examiner

SYSTEM AND METHOD FOR ACCRETION DETECTION

PRIORITY CLAIM

This U.S. patent application claims priority under 35 U.S.C. § 119 to: India Application No. 201621035007, filed on Oct. 13 2016. The entire contents of the aforementioned application are incorporated herein by reference.

TECHNICAL FIELD

This disclosure relates generally to accretion detection, and more particularly to method and system for accretion detection within an iron kiln.

BACKGROUND

Sponge iron or Direct-reduced iron (DRI) is formed when naturally available iron ore which is an oxidized form of iron (magnetite (Fe3O4) or hematite (Fe2O3)) is reduced to a metallic form by a reduction process. The reduction process occurs below a melting temperature of both metallic iron and the oxidized form. During the reduction process a large amount of material gets eliminated during oxygen removal. Oxygen removal from iron ore creates multiple microscopic pores in the iron ore. The microscopic pores give the iron ore a sponge like texture and hence it is termed as sponge iron. Due to high purity, the sponge iron is an excellent feedstock for electric furnaces used by various mini mills.

Typically, in industrial applications, a rotary kiln is utilized for formation of the sponge iron. The rotary kiln is a cylindrical vessel, inclined slightly to the horizontal which is rotated slowly about an axis. Mixture of iron ore, coal and Dolo is fed into the upper end of the cylinder. As the rotary kiln rotates, the materials gradually moves down towards the lower end, and may undergo a certain amount of stirring and mixing. Hot gases pass along the rotary kiln, sometimes in the same direction as the process material (co-current), but usually in the opposite direction (counter-current).

Over a period of time some of the input materials stick with the wall of the rotary kiln called accretion. The accretion starts to block the flow of materials within the rotary kiln. Gradually thickness of the accretion increases and at some point of time the accretion totally blocks the path of flow of materials inside the kiln. Then the operation has to be shut down and the rotary kiln has to be cleaned. Each shout down reduces production. If location of accretion inside the rotary kiln can be spotted at an early stage then the accretion can be broken by certain methods in the running kiln and shut down can be avoided.

SUMMARY

Embodiments of the present disclosure present technological improvements as solutions to one or more of the above-mentioned technical problems recognized by the inventors in conventional systems. For example, in one embodiment, a processor implemented method for accretion detection is provided. The method can be executed on a computing device. The method includes, receiving, via one or more hardware processors, in real-time, a first plurality of temperature values of the plurality of distinct locations from a plurality of sensors. Each of the plurality of sensors are configured on the plurality of distinct locations on the outer surface of the iron kiln and are associated with a distinct sensor ID. Further, the method includes comparing, via the one or more hardware processors, the plurality of temperature values with a reference temperature value to identify deviation in temperature gradient associated with the outer surface. Subsequently, on identifying the deviation corresponding to one or more sensors of the plurality of sensors, the method includes recording, via the one or more hardware processor, a second plurality of temperature values of a plurality of surrounding locations of the one or more sensors and determining presence of the accretion in the iron kiln based on the second plurality of temperature values.

In another embodiment, a system for accretion detection within an iron kiln is provided. The system includes a plurality of sensors configured on a plurality of distinct locations on the outer surface of the cylindrical body to measure temperature at the outer surface, the plurality of sensors associated with a distinct sensor ID, one or more memories, and one or more hardware processors. The one or memories store the plurality of distinct locations and respective sensor ID corresponding to the plurality of sensors, and a reference temperature value associated with the outer surface of the iron kiln. The one or more memories are coupled to the one or more hardware processors, such that the one or more hardware processors are configured by the said instructions stored in the one or more memories. Further, the one or more hardware processors are configured by the said instructions to receive, in real-time, a first plurality of temperature values of the plurality of distinct locations from the plurality of sensors. Further, the one or more hardware processors are configured by the said instructions to compare the plurality of temperature values with the reference temperature value to identify deviation in temperature gradient associated with the outer surface. Subsequently, on identifying the deviation corresponding to one or more sensors of the plurality of sensors, the one or more hardware processors are configured by the said instructions to record a second plurality of temperature values of a plurality of surrounding locations of the one or more sensors and to determine presence of the accretion in the iron kiln based on the second plurality of temperature values.

In yet another embodiment, a non-transitory computer-readable medium having embodied thereon a computer program for executing a method for accretion detection within an iron kiln is provided. The method includes, receiving, in real-time, a first plurality of temperature values of the plurality of distinct locations from a plurality of sensors, each of the plurality of sensors configured on the plurality of distinct locations on the outer surface of the iron kiln and are associated with a distinct sensor ID. Further, the method includes comparing the plurality of temperature values with a reference temperature value to identify deviation in temperature gradient associated with the outer surface. Subsequently, on identifying the deviation corresponding to one or more sensors of the plurality of sensors, the method includes recording a second plurality of temperature values of a plurality of surrounding locations of the one or more sensors. Also the method includes determining presence of the accretion in the iron kiln based on the second plurality of temperature values.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary

DETAILED DESCRIPTION

Figure 1:
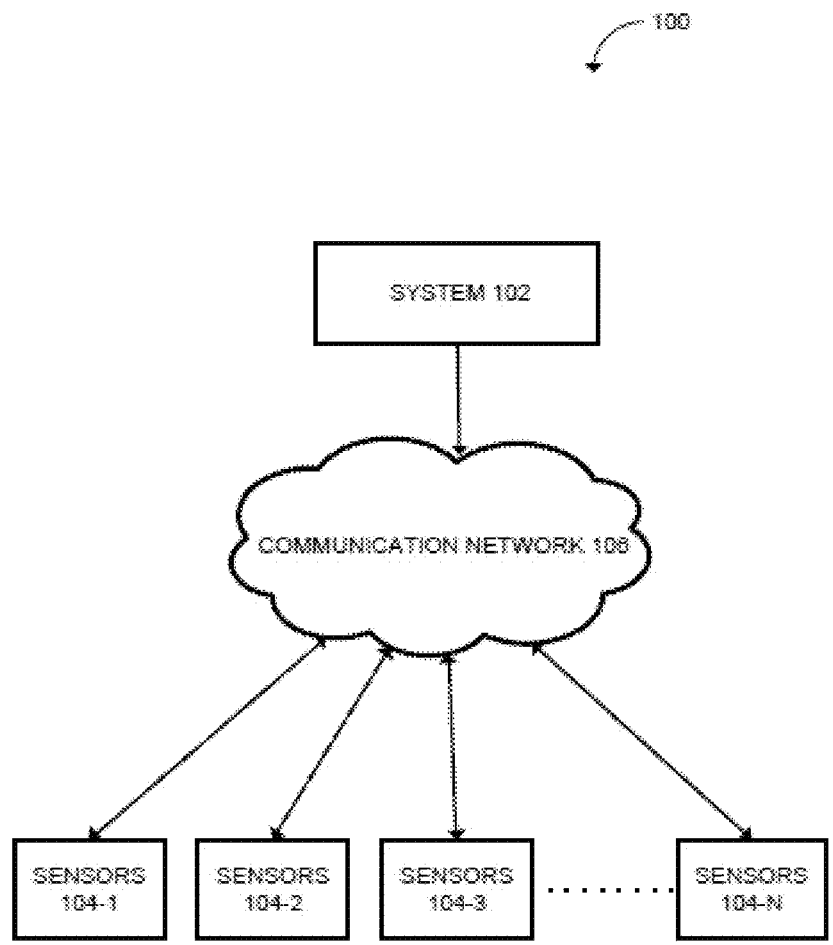
FIG. 1 illustrates a network implementation for accretion detection, in accordance with an example embodiment.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments herein provide a system and method for accretion detection. Accretion is a growth or increase by the gradual accumulation of additional layers of combination of input material inside a cylindrical body of an iron kiln. The disclosed system enables the detection of accretion inside the iron kiln based on a measurement of the outer surface temperature of the iron kiln. Herein, a plurality of temperature sensors are installed on the outer surface of the iron kiln to constantly measure the temperature. Alternatively, the sensors may measure the temperature of the outer surface of the iron kiln at frequent intervals of time. The disclosed method and system are not limited to the cited example scenarios and can be included in a variety of applications and scenarios without departing from the scope of the embodiments. Referring now to the drawings, and more particularly to FIGS. 1 through 5, where similar reference characters denote corresponding features consistently throughout the figures, there are shown preferred embodiments and these embodiments are described in the context of the following exemplary system and/or method.

Herein, the purpose of accretion detection is to detect the formation of accretion inside the iron kiln at early stages so that the accretion can be removed in the early stages of formation using various thermal shock methods without having to shut the operation of the iron kiln. Due to preclusion of shutting down the operations of the iron kiln, the deployment of the system facilitates in increasing efficiency of operation of the iron kiln. The present system embodies data acquisition models which are based on pre-defined rules to plot a graph by comparing temperature values acquired from the temperature sensors with a reference temperature of the iron kiln. Herein, detection of accretion is performed for a rotary iron kiln. The temperature sensors are installed throughout the outer surface of the iron kiln at pre-defined locations.

Various embodiments disclosed herein provide method and system for accretion detection, thereby achieving an early detection of accretion formation within the iron kiln. A network implementation for accretion detection is described further with reference to FIG. 1.

FIG. 1 illustrates a network implementation 100 for accretion detection, in accordance with an embodiment of the present subject matter. The network implementation 100 is shown to include a system 102 which can be implemented in one or more computing devices, a plurality of sensors such as sensors 104-1, 104-2, 104-3, ... 104-N installed on an outer surface of the iron kiln, and a communication network 106 for facilitating communication between the system 102 and the plurality of sensors 104-1, 104-2, 104-3, ... 104-N. For the brevity of description, the plurality of sensors 104-1, 104-2, 104-3 ... 104-N may be termed as sensors 104. Herein, it will be understood that the system 102 may be implemented as a variety of computing platforms, such as Android®, iOS®, Symbian®, Windows®, Blackberry®, and the like. Examples of the system 102 may include, but are not limited to, a portable computer, a personal digital assistant, a handheld device, and a workstation mobile headset, and the like.

Herein, the system 102 may receive the sensor data from multiple sensor devices or sensors 106. Examples of the sensor 104 may include, but are not limited to temperature sensors, pressure sensors and so on. The sensor devices 106 are communicatively coupled to the system 102 through a network 106. The terms 'sensor devices' and 'sensors' may refer to the devices that may provide sensor data to the system 102, and thus the terms 'sensor device' and 'sensor' may be used interchangeably throughout the description. In an embodiment, the sensor devices 104 may include industrial machines which contain readings/data from various sensors (engine speed, fuel consumption, and the like) observed on regular intervals of time.

In one implementation, the communication network 106 may be a wireless network, a wired network or a combination thereof. The communication network 106 can be implemented as one of the different types of networks, such as intranet, local area network (LAN), wide area network (WAN), the internet, and the like. The communication network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

The disclosed system 102 provides accretion detection within an iron kiln to enable early detection of accretion during initial stages of formation thereof. Herein, temperature values from various distinct positions on the outer surface of the cylindrical body of the iron kiln are measured to detect accretion formation within the iron kiln. The present system 102 includes an accretion plotting system which plots a graph identifying location and dimensions of the accretion formed within the iron kiln. An example implementation of the system 102 is described further in detail with reference to FIG. 2.

Figure 2:
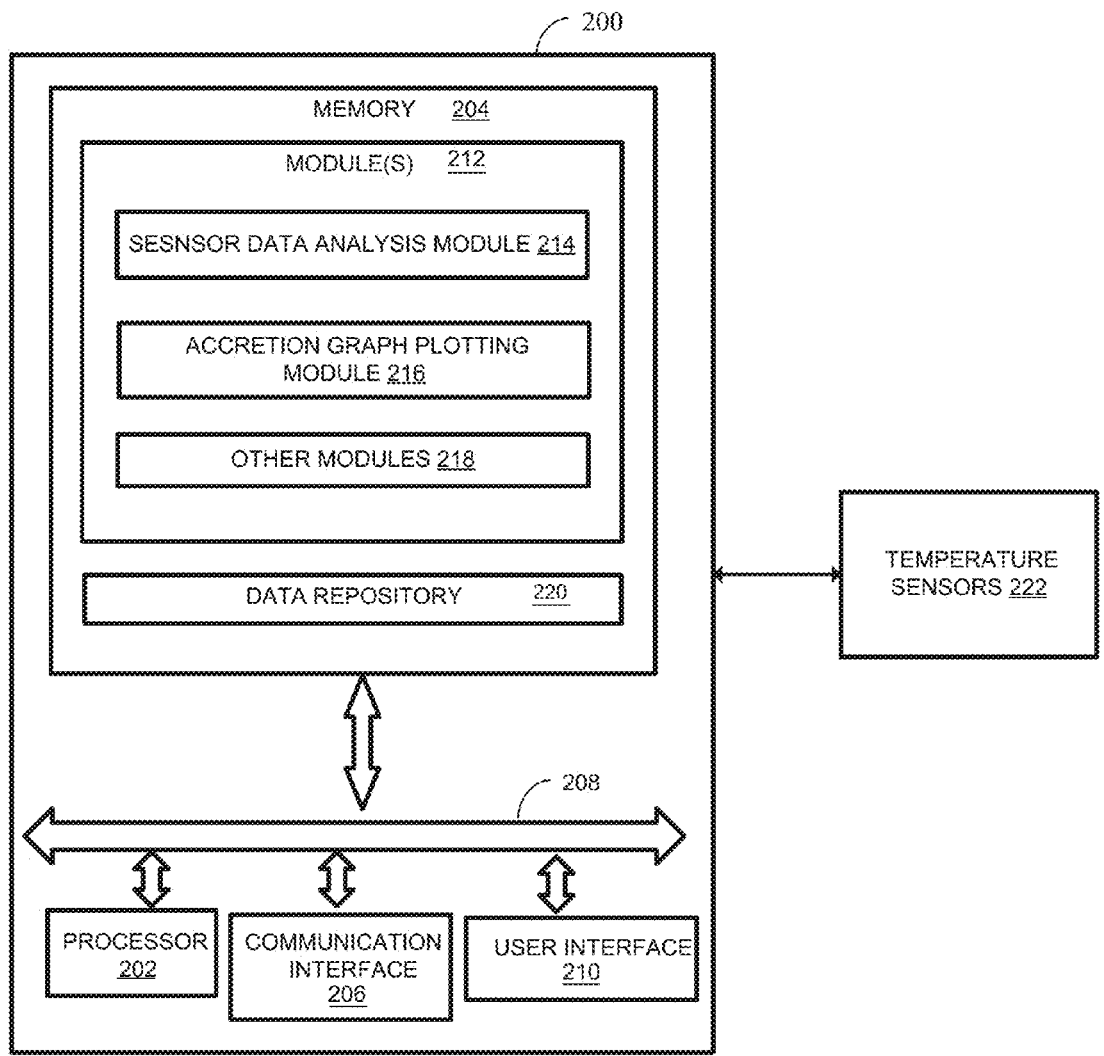
FIG. 2 illustrates a block diagram of a system for accretion detection, in accordance with an embodiment.

FIG. 2 illustrates a block diagram of a system 200 for accretion detection, according to an embodiment of present disclosure. In an embodiment, the system 200 may be embodied or executed in a computing device, for instance the computing device 102 (FIG. 1). Alternatively, the system 200 may be a distributed system distributed in a plurality of computing devices associated with the accretion detection. The system 200 includes or is otherwise in communication with one or more hardware processors such as a processor 202, one or more memories such as a memory 204, a communication interface 206 and a user interface 210. The processor 202, the memory 204, the communication interface 206 and the user interface 210 may be coupled by a system bus such as a system bus 280 or a similar mechanism. The system 200 is in communication with a plurality of temperature sensors 222. Various components of the system 200, along with functionalities thereof are explained below.

In an embodiment, the processor 202 may include circuitry implementing, among others, audio and logic functions associated with the communication. For example, the processor 202 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The processor 202 may include, among other things, a clock, an arithmetic logic unit (ALU) and logic gates configured to support operation of the processor 202. Further, the processor 202 may include functionality to execute one or more software programs, which may be stored in the memory 204 or otherwise accessible to the processor 202.

The one or more memories such as a memory 204, may store any number of pieces of information, and data, used by the system 200 to implement the functions of the system 200. The memory 204 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the processor 202 to carry out various functions in accordance with various example embodiments. The memory 204 may store information regarding a plurality of temperature sensors and the position at which each of the sensors is located on the surface of the cylindrical body of the iron kiln. Additionally or alternatively, the memory 204 may be configured to store instructions which when executed by the processor 202 causes the system 200 to behave in a manner as described in various embodiments.

In an embodiment, said instructions may be in the form of a program or software. The software may be in the form of system software or application software. The system for accretion detection, may be facilitated through a computer implemented application available over a network such as the Internet.

The memory 204 also includes module(s) 212 and a data repository 220. The module(s) 212 include, for example, a sensor data analysis module 214, an accretion graph plotting module 216, and other module(s) 218. The other module(s) 218 may include programs or coded instructions that supplement applications or functions performed by the accretion detection system 200. The temperature sensors 222 include a plurality of sensors which are installed on the outer surface of the iron kiln. The data repository 220 may include data acquired by the plurality of sensors and a history of functioning of the iron kiln. Further, the data repository 220 amongst other things, may serve as a repository for storing data that is processed, received, or generated as a result of the execution of one or more modules in the module(s) 212. The data repository 220 may include sensor details of the temperature sensors, their location information on the surface of the iron kiln along with a sensor ID (identification number) and other data.

Although the data repository 220 is shown internal to the accretion detection system 200, it will be noted that, in alternate embodiments, the data repository 220 can also be implemented external to the accretion detection system 200, where the data repository 220 may be stored within a database communicatively coupled to the accretion detection system 200. The data contained within such external database may be periodically updated. For example, new data may be added into the database and/or existing data may be modified and/or non-useful data may be deleted from the database. In one example, the data may be stored in an external system. In another embodiment, the data stored in the data repository 220 may be distributed between the accretion detection system 200 and the external database.

The communication interface 206 is configured to facilitate communication between the network 106 and the system 200. The communication interface 206 may be in form of a wireless connection or a wired connection. Examples of wireless communication interface 206 may include, but are not limited to, IEEE 802.11 (Wifi), BLUETOOTH®, or a wide-area wireless connection. Example of wired communication interface 206 includes, but is not limited to Ethernet.

In an example embodiment, a user interface 210 may be in communication with the processor 202. Examples of the user interface 210 include but are not limited to, input interface and/or output user interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 210 may include, among other devices or elements, any or all of a speaker, a microphone, a display, and a keyboard, touch screen, or the like. The user interface 210 displays the accretion graph generated by the system 200 to a site operator or user for further action.

In an example embodiment, the user or the site operator may be caused to access the accretion detection system (for example, system 200) using an internet gateway. In an embodiment, the processor 202 is configured to, with the content of the memory 204, and optionally with other components described herein, to cause the system 200 to enable detection of shape, size and location of accretion formation within the iron kiln. In an embodiment, the plurality of temperature sensors 222 may be located at pre-defined distances at a plurality of distinct locations over the entire outer surface of the cylindrical body of the iron kiln. Alternatively, the plurality of plurality of temperature sensors 222 may be located at distinct locations most likely to be affected due to formation of accretion. The distinct location of the each of the sensors is stored in the data repository along with the sensor ID associated with the respective sensors. The temperature sensors 222 measure a plurality of temperature values of the outer surface of the cylindrical body of the iron kiln at regular intervals. The temperature values are transmitted by radio frequency to the sensor data analysis module 214. Further, the temperature values along with the distinct location of each sensor and the sensor ID are utilized by the sensor data analysis module 214 for detecting the presence of accretion inside the iron kiln based on a temperature gradient.

In case there is no accretion inside the iron kiln, then for specific operational parameters the temperature of the outer surface of the iron kiln will be maximum. The maximum temperatures of the iron kiln at different regions for different set of operational parameters are known based on a past data or historical data which is stored in the data repository 220. The past data or historical data includes working of the iron kiln along with past surface temperatures of the cylindrical body of the iron kiln. A first plurality of temperature values associated with one or more distinct locations are measured by the temperature sensors 222. Each of the temperatures values from the first plurality of temperature values is compared with a reference temperature value. The reference temperature is calculated as an Average Maximum Temperature (AMT) of the cylindrical body of the iron kiln. If the first plurality of temperature value at any distinct location on the surface of the cylindrical body of the iron kiln is determined to be less than or equal to the reference temperature value, then this may be indicative of a probability of an accretion being formed in that particular location/region. Subsequently, a second plurality of temperature values of the surrounding regions of the said distinct location (where the temperature was determined to be less than the AMT) are measured by temperature sensors 222 and transmitted into the sensor data analysis module 214. A second plurality of temperature values are measured by the temperature sensors 222 in a region surrounding the said distinct location. In an embodiment, the second plurality of temperature values may be measured manually utilizing a thermal gun. The second plurality of temperature values are also compared with the reference temperature value and if the second plurality of temperature values are also determined to be below the AMT, the presence of an accretion is detected. In an embodiment, based on the second plurality of temperature values, the accretion graph plotting module 216 generates a probable map of accretion inside the iron kiln. The accretion graph depicts the accretion formation over the entire inner surface of the cylindrical body of the iron kiln.

The following mathematical models may be utilized by the sensor data analysis module 214 to detect the presence of accretion.

Thickness of the accretion at any location inside the iron kiln = 
$f$ (outer temperature of the region)

Thickness of the accretion at any location inside the iron kiln $\propto$ $$\frac{1}{\text{Outer Temperature at the region}}$$

The dimensions of the accretion are obtained by computing thickness of the accretion based on equation:

Thickness of the accretion at any distinct location =

$$\frac{\delta(\text{Accretion Thickness})}{\delta(\text{Temperature})} \times (\text{average maximum temperature}$$

at the distinct location on the outer surface – shell temperature at the distinct location on the outer surface)

In an embodiment, the temperature values at various distinct points on the outer surface of the iron kiln are collected by utilizing a thermal gun. Any region where the temperature measured by a sensor is found to be less than the AMT, the temperature values of the surrounding regions are measured manually utilizing the thermal gun and then the said temperature values are entered into the system 200 for detection of accretion in the said region. The process flow of accretion detection is further described with reference to FIG. 3.

In another embodiment, thermal shock created by increasing temperature (by increasing air flow) and then cooling by water may be utilized for removing the accretion formed. The accretion graph may also provide suggestions of parameters for the thermal shock for removal of accretion. For example, if a large accretion has formed inside the iron kiln a large amount of thermal pressure would be required to break the accretion and vice versa.

Figure 3:
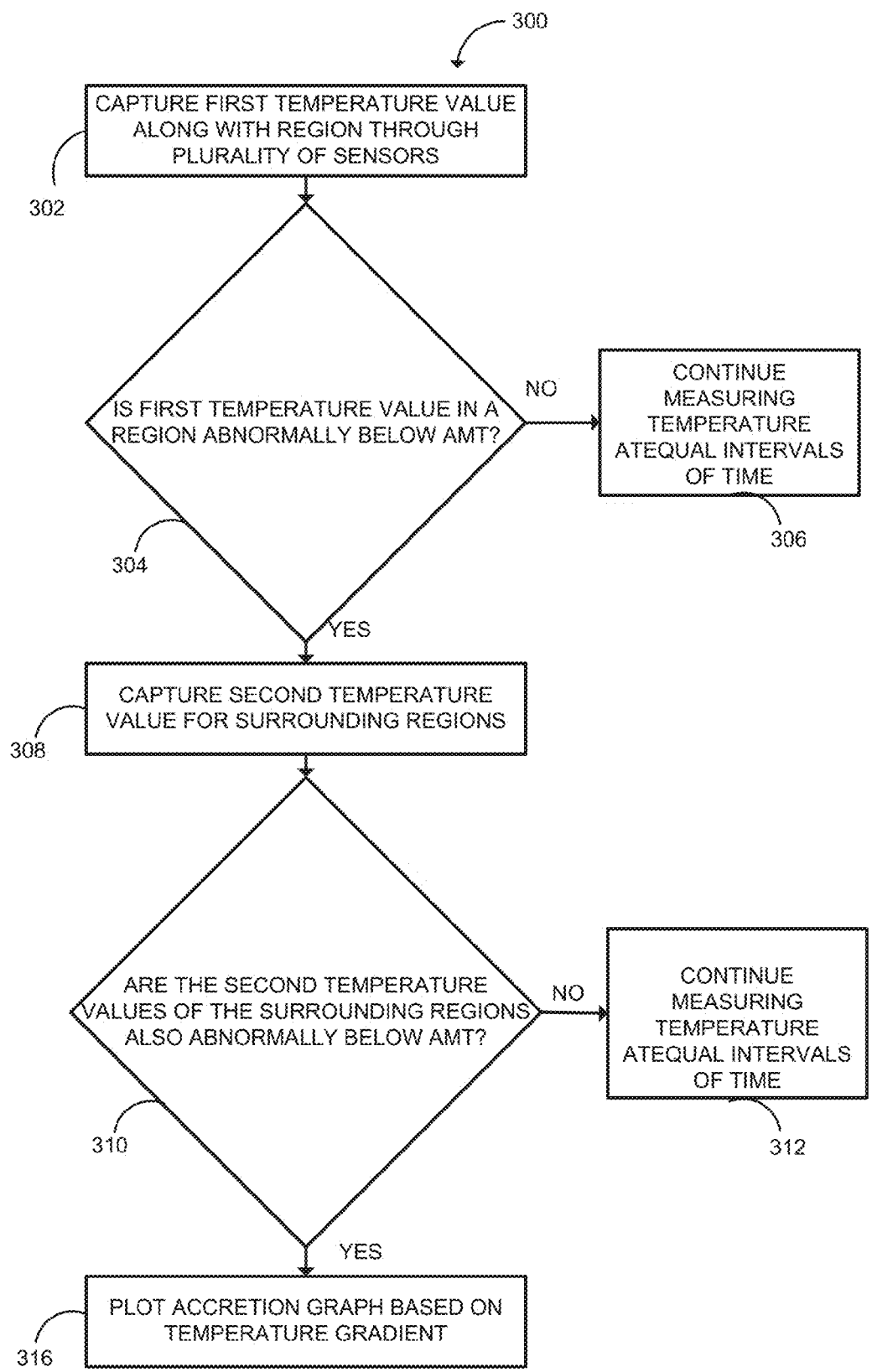
FIG. 3 illustrates a flow diagram depicting the process flow of method for accretion detection, in accordance with an embodiment.

FIG. 3 illustrates a flow diagram depicting the process flow of method 300 for accretion detection, in accordance with an embodiment. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communication network. The order in which the method 300 is described is not intended to be construed as a limitation, and any number of the described method blocks can be combined in any order to implement the method 300, or an alternative method. Furthermore, the method 300 can be implemented in any suitable hardware, software, firmware, or combination thereof.

In an embodiment, the method 300 for accretion detection can be implemented by a system, for example, the system 200 (FIG. 2). At step 302 of method 300, a first plurality of temperature values at various distinct locations or regions of the outer surface of the cylindrical body of the iron kiln are captured by the temperature sensors installed on the outer surface of the iron kiln. The first plurality of temperature values refers to the temperature at respective locations of the iron kiln being captured by respective sensors installed at said locations. Herein, the terms 'distinct location' and 'region' are used interchangeably throughout the description. At step 304, each of the first plurality of temperature values at each distinct location is compared with the AMT value. If the temperature value at a distinct location' (for example, location A) is equal to or more than the AMT, the process of temperature value measurement continues at equal intervals of time at step 306. However, if the temperature value at a given region (location A) is below the AMT, at step 306 a second plurality of temperature values of the surrounding areas of the said distinct location (location A) is captured.

At step 308, if the second plurality of temperature values of the surrounding areas of location A is equal or greater than the AMT no action is required to be taken by the system. However, if the second plurality of temperature values of the surrounding areas of location A is abnormally below the AMT, an accretion is detected by the system 200. In an embodiment, thickness of the accretion at any region/location inside the iron kiln is an inverse function of outer temperature of that region/location/point. Accordingly, based on the temperature values detected at the outer surface of the iron kiln, dimensions of the accretion formed at various regions/locations within the iron kiln may be determined. At step 310, an accretion graph depicting the dimensions of the accretion formed inside the iron kiln is plotted by the system 200 based on the temperature gradient. The process of calculation of dimensions of the accretion is further explained with respect to FIGS. 5A, 5B and 5C. A framework of the system 200 performing the method 300 for accretion detection is further illustrated in FIG. 4.

Figure 4:
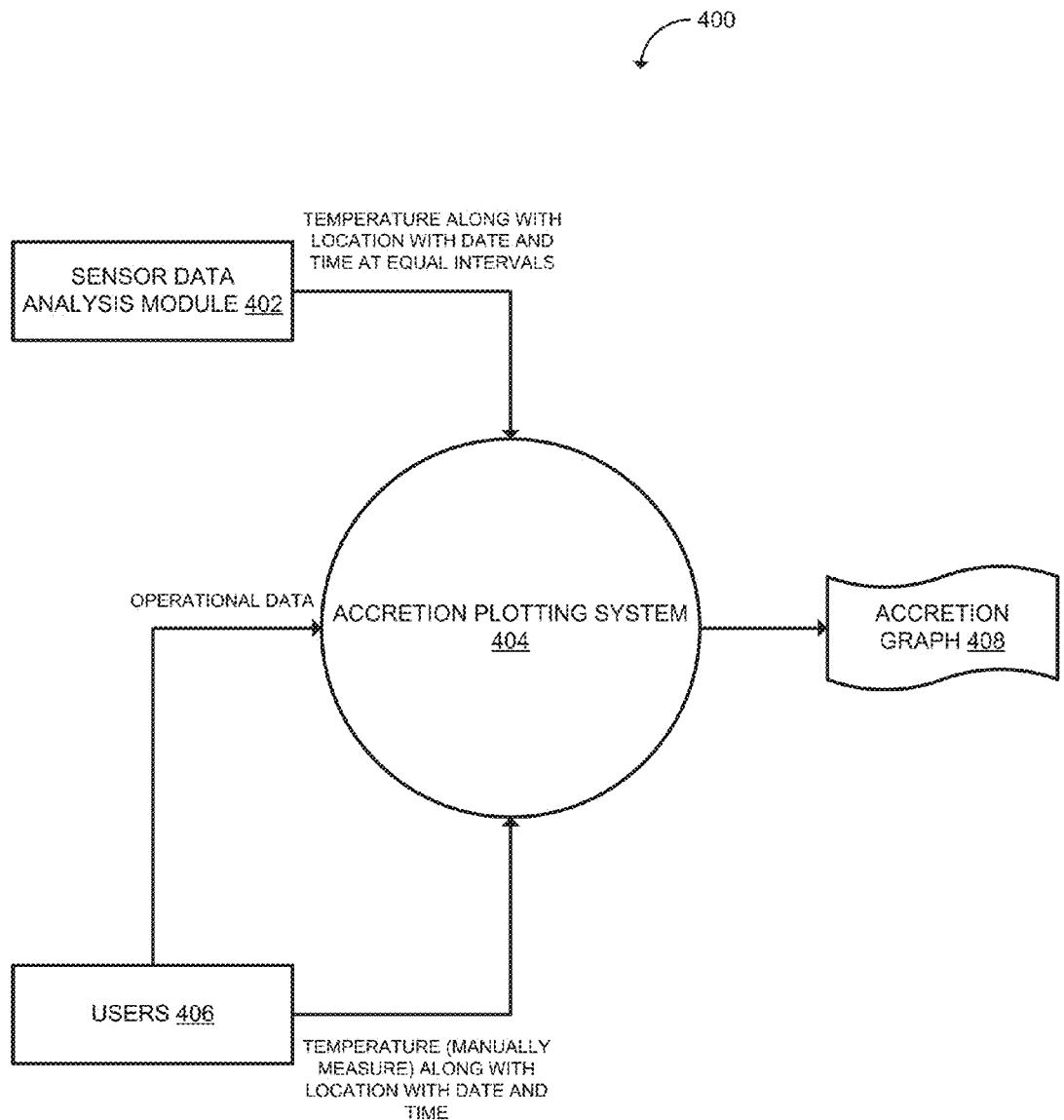
FIG. 4 illustrates a framework of a system for accretion detection, in accordance with an example embodiment.

FIG. 4 illustrates a framework of the accretion detection system, in accordance with an example embodiment. A sensor data analysis module 402 analyses the data obtained from the plurality of sensors installed on the outer surface of the iron kiln at equal intervals of time. Herein, the sensor data analysis module 402 is similar to the sensor data analysis module 214 (FIG. 2).

In an embodiment, users 406 may be enabled to manually input temperature values measured on the outer surface of the iron kiln into the system 200 (FIG. 2) along with the location and the date and time at which the temperature was measured for accretion detection. The users may also input operational data of the iron kiln for accurate prediction of the location of the accretion inside the iron kiln by the system 200. The operational data includes, parameters such as, but not limited to coal grade feed in the iron kiln, iron ore quality, environmental temperature, pressure and the like.

Based on the analysis by the sensor data analysis module 402 and the operational data of the iron kiln, the accretion plotting module 404 plots a graph depicting the location and dimensions (shape and size) of the accretion formed inside the entire length of the cylindrical body of the iron kiln.

The accretion graph 408 is generated by the accretion plotting module 404 based on the temperature values obtained from the plurality of sensors and manually. The accretion graph 408 is displayed to the user so as to take appropriate measures for accretion removal. The process of calculating the dimensions of the accretion formed inside the iron kiln is illustrated in FIGS. 5A, 5B and 5C.

Figure 5A:
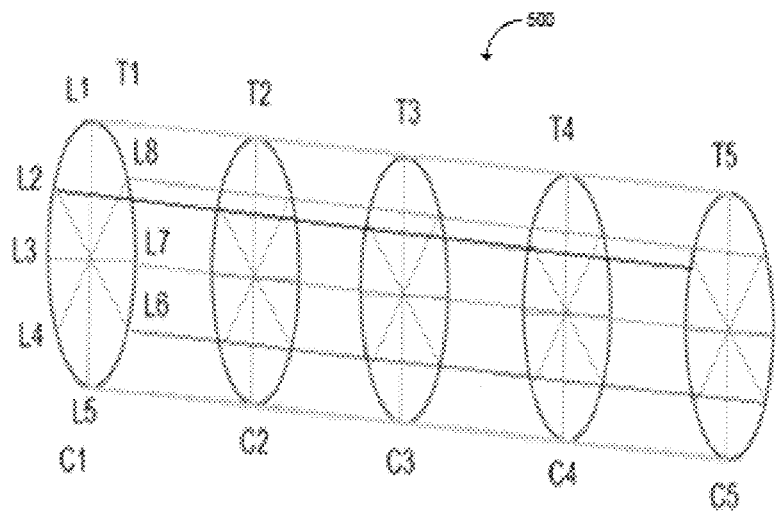
FIGS. 5A, 5B and 5C illustrate a diagram for measurement of dimensions of the accretion formed inside the iron kiln, in accordance with an example embodiment.
Figure 5B:
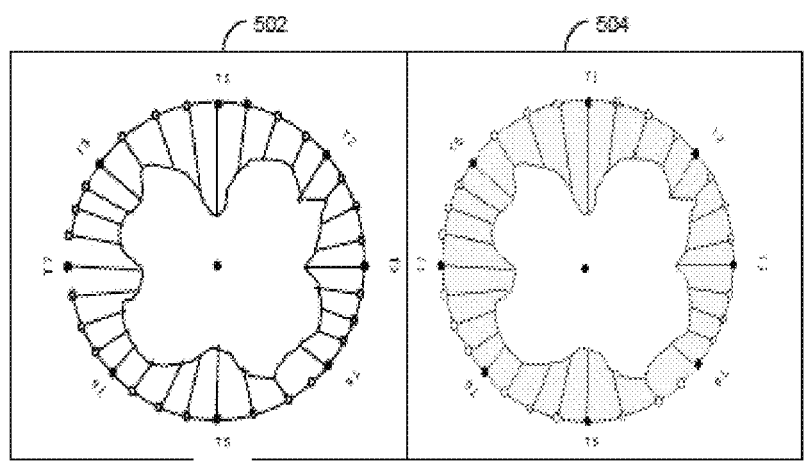
Figure 5C:
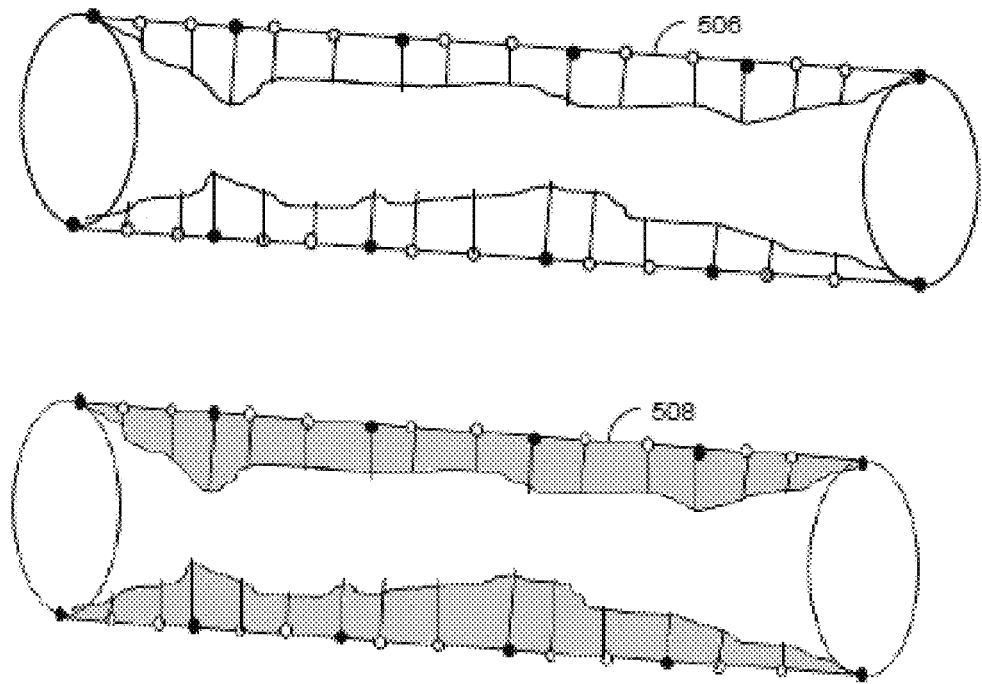

FIGS. 5A, 5B and 5C illustrate a diagram for measurement of dimensions of the accretion formed inside the iron kiln, in accordance with an example embodiment. The FIG. 5A illustrates a horizontally inclined cylindrical body of an iron kiln 500 within which the process of accretion detection is performed utilizing the disclosed system 200 (as depicted in FIG. 2). The cylindrical body of the iron kiln 500 is rotated slowly about an axis. The iron kiln 500 is assumed to be made of "n" number of concentric circles of same radius having center on the axis of the iron kiln. Each circle is at a pre-defined distance from the mouth of the iron kiln 500. The circles are depicted as "Cn" (circle number), the circle nearest to the mouth of the iron kiln 500 is marked as circle no. 1 (C1) and the remaining circles are marked as C2, C3, C4 and so on, towards the end of the iron kiln.

Further, the iron kiln 500 is also assumed to be made of "n" number of lines parallel to the axis of the iron kiln 500. The lines are depicted as Ln (line number) and any one line maybe marked as line no. 1 (L1) and then the remaining lines maybe marked as L2, L3, L4 and so on, in an anti-clockwise direction.

A distinct location on the outer surface of the iron kiln 500 can be identified by a co-ordinate (circle number and line number). For example, in FIG. 5A a distinct location can be located at the intersection of circle C2 and line L1. A plurality of temperature sensors (T1, T2, T3 . . . Tn) are installed at the intersection of the circles and the lines on selected circles and lines. Hence, position of each temperature sensor can be provided by the system of coordinate (circle number and line number). On each circle a plurality of temperature sensors can be installed along pre-assigned line numbers. In FIG. 5A, 8 temperature sensors are installed on "n" selected circles where the circles cut line no. L1, L2, L3, L4, L5, L6, L7 and L8.

FIG. 5B, illustrates the positioning of the temperature sensors for determining the accretion shape at any given time at any circle as a cross section parallel to the iron kiln mouth 502. The fixed 8 temperature sensors (solid black points) on the circle provide surface temperature of the kiln at respective locations. Between two temperature sensors, temperature at each unit distance on a circle (hollow points) is estimated by utilizing an interpolation method. If required, the temperature at any of the hollow points can be measured through a thermal gun. Once the temperature of all distinct locations in consideration are known (measured or estimated), the system 200 (FIG. 2) will estimate a thickness of the accretion on each such distinct location. Also, by joining the tips of thickness lines, shape of the accretion at the circle is created and displayed 504.

FIG. 5C, illustrates determination of the accretion shape at any given two lines (top and bottom) as vertical cross section along with the iron kiln length 506. The fixed temperature sensors (solid black points) on the lines provide surface temperature of the iron kiln at respective distinct locations. Between two temperature sensors, temperature at each unit distance on the line (hollow points) is estimated by utilizing an interpolation model. The temperature of any hollow point may be measured through a thermal gun. Once the temperature of all distinct locations in consideration are known (measured or estimated), the system estimates thickness of the accretion formed on each such point based on surface temperature. Also, by joining the tips of thickness lines, shape of accretion at the two lines is created 508. An accretion graph is illustrated in FIG. 6.

Figure 6:
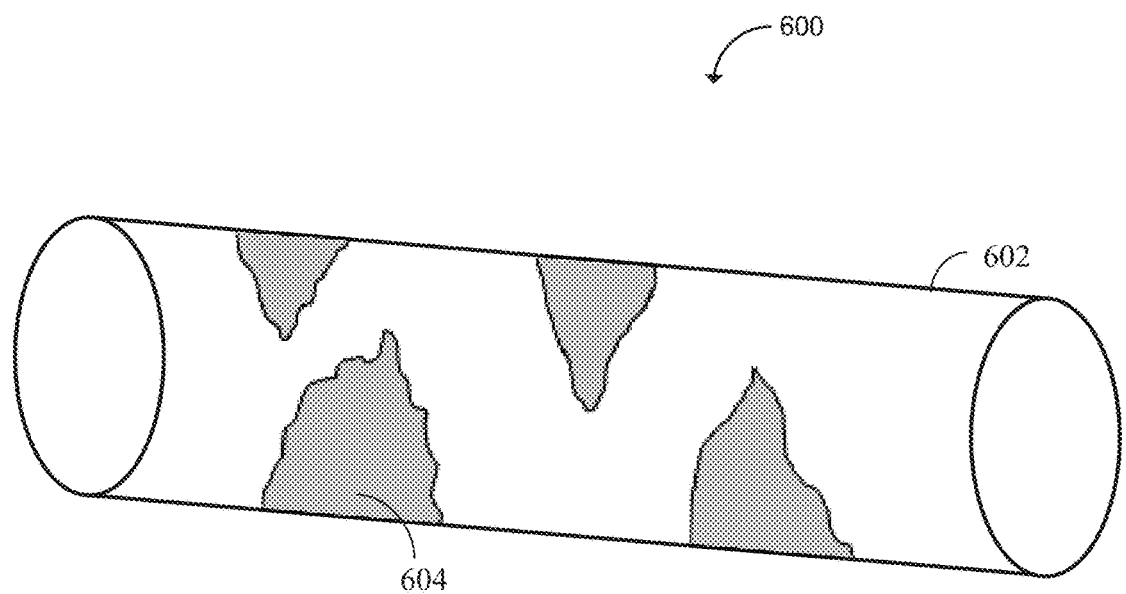
FIG. 6 illustrates an accretion graph, in accordance with an example embodiment.

FIG. 6 illustrates an accretion graph, in accordance with an example embodiment. The figure illustrates a cylindrical body of an iron kiln 602 within which the process of accretion detection is performed utilizing the disclosed system 200 (as depicted in FIG. 2). The location of the accretion 604 inside the iron kiln is illustrated along with the shape and size of the accretion.

It will be noted herein that the disclosed method and system can be utilized for accretion detection in various types of cylindrical kiln such as, rotary iron kiln, cement kiln, ceramic kiln, metal kiln and the like.

The present system relates to accretion formation, thickness detection and forecasting methods. The changes in the iron kiln shell or outer surface temperatures are utilized to detect the shape, size and location of the accretion by a mathematical model. The system is also utilized to predict the growth trend in kiln accretion formation. The system enables the site operator to adjust the production of iron ore based on the accretion formation inside the iron kiln and thereby improving operational stability of the iron kiln.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system for accretion detection within an iron kiln, the iron kiln comprising a cylindrical body for holding and processing molten iron ore, the system comprising:
    a plurality of sensors configured on a plurality of distinct locations on an outer surface of the cylindrical body to measure temperature at the outer surface, the plurality of sensors associated with a distinct sensor ID;
    one or more memories to store the plurality of distinct locations and respective sensor ID corresponding to the plurality of sensors, and a reference temperature value associated with the outer surface; and
    one or more hardware processors, the one or more memories coupled to the one or more hardware processors, wherein the one or more hardware processors configured to execute programmed instructions stored in the one or more memories to:
        receive, in real-time, a first plurality of temperature values of the plurality of distinct locations from the plurality of sensors;
        compare the plurality of temperature values with the reference temperature value to identify deviation in temperature gradient associated with the outer surface;
        on identifying the deviation corresponding to one or more sensors of the plurality of sensors, record a second plurality of temperature values of a plurality of surrounding locations of the one or more sensors; and
        determine presence of the accretion in the iron kiln based on the second plurality of temperature values.

2. The system of claim 1, wherein the reference temperature value is an average maximum temperature of the outer surface of the iron kiln.

3. The system of claim 1, wherein the one or more hardware processors are configured to execute the programmed instructions to compute dimensions of the accretion based on the second plurality of temperature values.

4. The system of claim 3, wherein the one or more hardware processors are configured to execute the programmed instructions to compute the dimensions of the accretion based on the following equation:

$$\text{Thickness of accretion at any distinct location} = \frac{\delta(\text{Accretion Thickness})}{\delta(\text{Temperature})} \times (\text{average maximum temperature for a distinct location on the outer surface} - \text{shell temperature at the distinct location on the outer surface}).$$

5. The system of claim 4, wherein the one or more hardware processors are configured to execute the programmed instructions to plot a graph indicating dimensions and location of the accretion inside the cylindrical body of the iron kiln.

6. A processor-implemented method for accretion detection within an iron kiln, the iron kiln comprising a cylindrical body for holding and processing molten iron ore, the method comprising:
    receiving, in real-time, a first plurality of temperature values of a plurality of distinct locations from a plurality of sensors via one or more hardware processors, each of the plurality of sensors configured on the plurality of distinct locations on an outer surface of the cylindrical body and associated with a distinct sensor ID;
    comparing, via the one or more hardware processors, the plurality of temperature values with a reference temperature value to identify deviation in temperature gradient associated with the outer surface;
    on identifying the deviation corresponding to one or more sensors of the plurality of sensors, recording via the one or more hardware processors, a second plurality of temperature values of a plurality of surrounding locations of the one or more sensors; and
    determining presence of the accretion in the iron kiln based on the second plurality of temperature values, via the one or more hardware processors.

7. The method of claim 6, wherein the reference temperature value is an average maximum temperature of the outer surface of the iron kiln.

8. The method of claim 6, further comprising computing dimensions of the accretion based on the second plurality of temperature values.

9. The method of claim 8, wherein computing the dimensions of the accretion comprises computing thickness of the accretion based on the following equation:

$$\text{Thickness of accretion at any distinct location} = \frac{\delta(\text{Accretion Thickness})}{\delta(\text{Temperature})} \times (\text{average maximum temperature for a distinct location on the outer surface} - \text{shell temperature at the distinct location on the outer surface})".$$

10. The method of claim 9, further comprising plotting a graph indicating the dimensions and location of the accretion inside the cylindrical body of the iron kiln.

11. A non-transitory computer-readable medium having embodied thereon a computer program for executing a method for accretion detection within an iron kiln, the iron kiln comprising a cylindrical body for holding and processing molten iron ore, the method comprising:

receiving, in real-time, a first plurality of temperature values of a plurality of distinct locations from a plurality of sensors, each of the plurality of sensors configured on the plurality of distinct locations on an outer surface of the cylindrical body and associated with a distinct sensor ID;

comparing the plurality of temperature values with a reference temperature value to identify deviation in temperature gradient associated with the outer surface;

on identifying the deviation corresponding to one or more sensors of the plurality of sensors, recording a second plurality of temperature values of a plurality of surrounding locations of the one or more sensors; and determining presence of the accretion in the iron kiln based on the second plurality of temperature values, via the one or more hardware processors.

* * * * *